(12) United States Patent
Kraus et al.

(10) Patent No.: US 6,933,630 B2
(45) Date of Patent: Aug. 23, 2005

(54) DRIVE MECHANISMS FOR SMALL ELECTRIC APPLIANCES

(75) Inventors: Bernhard Kraus, Braunfels (DE); Alexander Klös, Hofheim (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 11/004,196

(22) Filed: Dec. 3, 2004

(65) Prior Publication Data

US 2005/0127759 A1 Jun. 16, 2005

Related U.S. Application Data

(63) Continuation of application No. PCT/EP02/12929, filed on Nov. 19, 2002.

(30) Foreign Application Priority Data

Jun. 6, 2002 (DE) .................................. 102 25 024

(51) Int. Cl.[7] ............................................ H02K 33/02
(52) U.S. Cl. ............................ 310/38; 310/36; 30/43.7
(58) Field of Search .............................. 310/17, 36–39, 310/114, 118; 30/43.7, 43.8, 43.91

(56) References Cited

U.S. PATENT DOCUMENTS

| 2,741,711 | A | 4/1956 | Meyerink ..................... 310/29 |
| 5,921,134 | A | 7/1999 | Shiba et al. ................... 74/110 |
| 6,098,288 | A | 8/2000 | Miyagawa et al. ........ 30/43.91 |
| 6,226,871 | B1 | 5/2001 | Eichhorn et al. .......... 30/43.92 |
| 6,501,357 | B2 * | 12/2002 | Petro .......................... 335/229 |
| 6,633,143 | B2 * | 10/2003 | Weston et al. ................. 318/34 |

FOREIGN PATENT DOCUMENTS

| DE | 2 65 598 | 3/1950 | |
| DE | 1 151 307 | 7/1996 | |
| EP | 1 162 721 | 12/2001 | .......... H02K 33/10 |
| FR | 2 179 653 | 11/1973 | .......... H02K 33/00 |
| JP | 2000-316267 | 11/2000 | .......... H02K 33/06 |

* cited by examiner

*Primary Examiner*—Darren Schuberg
*Assistant Examiner*—Judson H. Jones
(74) *Attorney, Agent, or Firm*—Fish & Richardson P.C.

(57) ABSTRACT

A small electric appliance drive mechanism includes a first drive component, a second drive component, and a coil configured to produce a magnetic field extending from the first drive component and acting on the second drive component. The first drive component and the second drive component are movably arranged in the small electric appliance and adapted to oscillate in phase opposition to one another.

30 Claims, 4 Drawing Sheets

DRIVE MECHANISMS FOR SMALL ELECTRIC APPLIANCES

CROSS-REFERENCE TO RELATED APPLICATIONS

This is a continuation of PCT Application No. PCT/EP02/12929, filed on Nov. 19, 2002, which claims priority to German Patent Application No. 102 25 024.3, filed on Jun. 6, 2002, which is incorporated herein by reference in its entirety.

TECHNICAL FIELD

This invention relates to drive mechanisms for small electric appliances.

BACKGROUND

DE 1 151 307 A discloses an oscillating armature drive for a dry shaving apparatus with a reciprocating shaving cutter. The oscillating armature drive has a U-shaped electromagnet formed with the housing of the shaving apparatus. A working armature and, on either side of the working armature, a compensating armature are arranged for oscillatory motion in the proximity of the poles of the electromagnet.

During operation, the working armature, which drives the shaving cutter, oscillates parallel to the pole faces of the electromagnet such that the compensating armature oscillates in phase opposition thereto in order to help prevent the oscillations of the working armature from being transferred to the housing of the shaving apparatus.

DE 196 80 506 T1 discloses an oscillatory linear motor having a stationary electromagnet and several movable components that are oscillated in phase opposition to each other by means of an electromagnet. To maintain the mutual phase relationship of the movable components under load, the components are interlinked by means of a linkage mechanism that transfers the oscillatory motion from one component to the other with simultaneous reversal of direction.

DE 197 81 664 C2 discloses an electric shaver with a linear drive that has a hollow cylindrical stator with an electromagnetic coil. Arranged in the stator are two movable elements that are driven in phase opposition to each other. One of the elements drives a shaving cutter. The other element may have a counterweight to suppress vibrations.

SUMMARY

In one aspect of the invention, a drive mechanism for generating an oscillatory motion of at least one working unit of a small electric appliance has a coil for producing a magnetic field that extends from a first drive component and acts on a second drive component that is movably arranged in the small electric appliance in such a way that the second drive component is oscillated. The first drive component is movably arranged in the small electric appliance in order to oscillate in opposite phase to the second drive component. As a result of the phase opposition in the oscillation of the two drive components, a significantly higher relative speed between the drive components can be achieved than with a conventional drive in which one drive component moves and the other drive component remains at rest. The efficiency of the drives generally increases with the relative speed of the drive components. Thus, it may be possible to achieve higher degrees of efficiency with the drive mechanisms described herein.

At least one of the two drive components may have one or more permanent magnets. Furthermore, at least one of the two drive components may have a wound core on which a coil is arranged. With this arrangement, it is possible, with relatively small dimensions, to obtain a powerful drive whose power consumption is sufficiently low to permit battery-powered operation of the small electric appliance, for example.

In some embodiments, at least one elastic element may be provided for producing restoring forces. Consequently, the oscillatory system can be operated at resonance.

Furthermore, the first drive component and the second drive component can advantageously be mechanically coupled to each other by at least one coupling element to help maintain the phase opposition of the oscillation of the two drive components. For example, the coupling element can be rotatably linked to the first drive component and to the second drive component. In this arrangement, the phase opposition may be obtained in particularly simple manner through the rotatable mounting of the coupling element. In certain embodiments the coupling element is rotatably mounted on a mounting axle for mounting the drive mechanism on the small electric appliance. Because the fulcrum of the coupling element does not move, the coupling element can be mounted on the small appliance without substantial difficulty. The mounting axle may be arranged mid-way between a link of the coupling element to the first drive component and to the second drive component. Consequently, the equality of amplitude of the oscillatory motions of the two drive components can advantageously be maintained under unequal loading of the drive components. In some embodiments, the coupling element can be constructed as a rotary beam. The coupling element may have at least one additional drive mount for providing an oscillatory motion that has an amplitude different than the oscillations of the first and the second drive components. Advantageously, no gearing is needed for providing the additional oscillatory motion. Thus, it is possible to reduce the expense of the device while increasing the reliability of the device.

In some embodiments, the drive mechanism is constructed as a linear motor in which the two drive components are slidable relative to each other, thus resulting in a linearly oscillatory motion. In some embodiments, the elastic element is constructed as a leaf spring that is fastened to the first drive component and to the second drive component. The leaf spring can counteract a displacement of the two drive components relative to each other. Advantageously, the leaf spring can be relatively small. The leaf spring may be fastened to at least one of the drive components in an arrangement to enable movement of the leaf spring across the direction of movement of the drive components. Consequently, the length of the leaf spring can be reduced upon bending. Alternatively or additionally, the coupling element can be linked to at least one of the drive components in an arrangement to allow movement of the coupling element across the direction of movement of the drive components.

The coupling element may be rotatably linked to reversing levers that are each connected to the drive component that lies farther away from the linking location. As a result of this arrangement, the two drive components are closest to each other in the position of equilibrium while moving apart from each other when displaced out of the position of equilibrium.

In some embodiments, the product of the mass of the first drive component and the distance between the linking location of the coupling element on the first drive component and the mounting axle is equal to the product of the mass of the second drive component and the distance between the linking location of the coupling element on the second drive component and the mounting axle. Consequently, low level transmission of vibrations to the small electric appliance can be substantially prevented.

In certain embodiments, the two drive components are substantially identical, which can decrease production costs. Furthermore, the wound core may be slidably arranged relative to the coil. Considering that with such an embodiment the coil does not move together with the wound core, the moving masses can be reduced, thereby reducing the vibrations on the small electric appliance. In addition, because the coil does not move, contacting the coil may be simplified.

The first drive component and the second drive component may be guided by means of linear bearings. In such embodiments, it is possible to produce a particularly precise linear motion. A similar effect can also be achieved by maintain a constant distance between the first drive component and the second drive component by means of at least one spacer element, for example. The spacer element can be mounted for rotation about the mounting axle and takes support in particular by means of curved surfaces upon seating surfaces of the first and the second drive component. The curved surfaces may be constructed as cylinder segments and the cylinder axes associated with the cylinder segments may be arranged to coincide with the respective mounting axle.

In certain embodiments, the drive mechanism is constructed as a rotary motor in which the two drive components are adapted to rotate relative to each other. In some embodiments, the two drive components have a common axis of rotation. It is thus possible to largely suppress the development of vibrations. As an alternative to its construction as a rotary beam, the coupling element may be constructed as a gearwheel, for example, which meshes with teeth in the first and second drive components.

Other features and advantages will be apparent from the description, the drawings, and the claims.

DESCRIPTION OF DRAWINGS

Like reference symbols in the various drawings indicate like elements.

DETAILED DESCRIPTION

The drive mechanisms described herein may be constructed as oscillatory linear motors or as oscillatory rotary motors. The oscillatory linear motor generally produces linear motions of small amplitude that may find application in electric shavers, for example. The oscillatory rotary motor generally produces small rotary movements whose direction of rotation reverses at periodic intervals, and is suitable for use on electric toothbrushes, for example.

Figure 1:
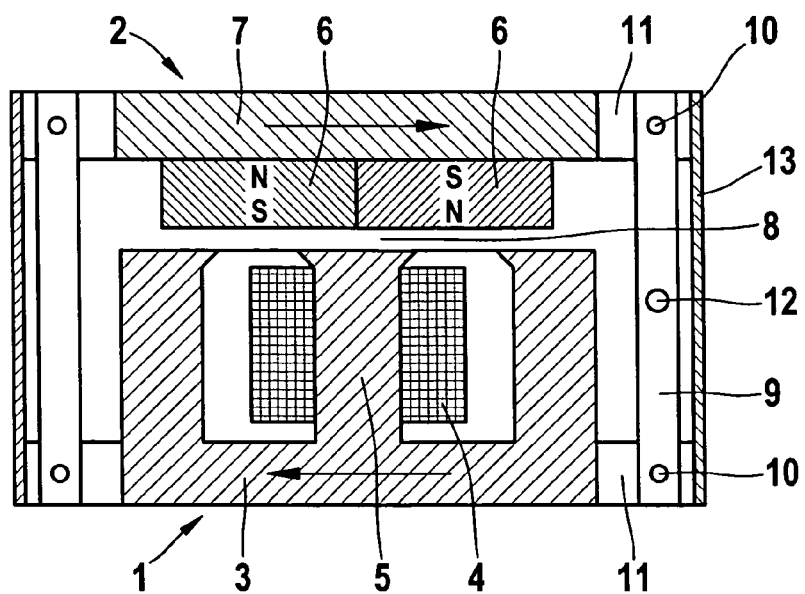
FIG. 1 is a cross-sectional view of an embodiment of an oscillatory linear motor.

FIG. 1 shows an embodiment of an oscillatory linear motor in a schematic representation. The linear motor has two movable components 1 and 2 that are arranged a small distance apart from one another. The first component 1 is comprised of an iron core 3, which is constructed in the shape of an "E", and of a wire-wound coil 4. The coil 4 is wound around a center beam 5 of the iron core 3. The second component 2 has two permanent magnets 6 that are arranged side by side with opposing polarity on a common carrier plate 7. Like the iron core 3, the carrier plate 7 is made from an iron material. The permanent magnets 6 are separated from the end of the center beam 5 of the iron core 3 by an air gap 8. The carrier plate 7, on which the permanent magnets 6 are arranged, has two posts 9 for supporting the carrier plate 7 on the iron core 3. The two posts 9 are each rotatably mounted, by means of connecting axles 10 in the area of their ends. For example, the connecting axles 10 can be positioned in bearing blocks 11 that are fastened to the iron core 3 and to the carrier plate 7. Mid-way between the connecting axles 10 each of the two posts 9 has a mounting axle 12 that serves to fasten the linear motor to its installation environment (e.g., to the housing of an electric shaver). Leaf springs 13 extend parallel to the posts 9 between the bearing blocks 11, which are fastened to the iron core 3 and to the carrier plate 7.

The mechanical construction of the linear motor shown in FIG. 1 can produce the following pattern of movement: The first and the second component 1 and 2 each execute an oscillatory motion, which extends essentially in horizontal direction (as shown by arrows in FIG. 1). The directions of movement of the two components 1 and 2 are in opposition to each other (e.g., the oscillations are of opposite phase). The oscillations can be constrained in phase opposition to each other by the rotary suspension of the posts 9 provided by the mounting axles 12, for example. This suspension can cause the course of travel of the centers of gravity of the first and second component 1 and 2 to follow a slightly curved course. In the representation of FIG. 1, for example, the route traveled by the center of gravity of the first component 1 curves slightly downward and the route traveled by the center of gravity of the second component curves slightly upward. This means that the distance between the first and the second component 1 and 2 is at its maximum in the position of equilibrium shown in FIG. I. For example, the air gap 8 is generally at its maximum size in the position of equilibrium. Generally, the greater the amount of displacement of the two components 1 and 2 out of the position of equilibrium, the smaller their relative distance becomes. Restoring forces generated by the leaf springs 13 can urge the components back into their position of equilibrium. In the position of equilibrium, the leaf springs 13 are not bent and therefore no restoring forces are generated. Hence, without the action of other forces, the two components 1 and 2 would remain in the position of equilibrium. As the displacement of the two components 1 and 2 out of their position of equilibrium increases, bending of the leaf springs 13 into an S-shaped configuration also increases. Consequently, the restoring forces in the direction of the position of equilibrium become active when the two components 1 and 2 are displaced out of their position of equilibrium. The S-shaped bending of the leaf springs 13 is accompanied by a reduction in their length. Allowance for this in the construction can be made by fastening the leaf springs 13 to at least one bearing block 11 with a small amount of play in the longitudinal direction (e.g., across the direction of movement of the components 1 and 2). Alternatively or additionally, it is possible to suspend the posts 9 with allowance for a small amount of play in the longitudinal direction from at least one bearing block 11. The play can be realized, for example, by means of an elastic suspension or by suspension with engagement in slots that can optionally have an elastic insert.

An electric current can be induced in the coil 4 in order to generate the described oscillatory motions of the two components 1 and 2. The coil 4 acts as an electromagnet and, assisted by the iron core 3, produces a magnetic field that acts on the permanent magnets 6 and results in relative movement between the coil 4 and the permanent magnets 6. Through suitable activation of the coil 4 it is possible to reverse the polarity of the resulting magnetic field, causing the first and the second component 1 and 2 to be set in oscillations of opposite phase. Both the first component 1 and the second component 2 of the drive mechanism move. For example, rather than a stator being used to drive a rotor, the two counter-oscillating components 1 and 2 can drive each other. One of these components 1 or 2, for example, can correspond to the rotor of a conventional linear motor. The other component can perform the functions of the stator of a conventional linear motor, but unlike such a stator it moves. Among other things, this results in the first and second component 1 and 2 of the linear motor moving at a relative speed to each other that is approximately twice as fast as the relative speed between a stator and a rotor of a conventional linear motor under identical conditions. A relatively high degree of efficiency can thus be achieved with the linear motor described herein.

The frequency of the oscillatory motion of the two components 1 and 2 is predetermined by the activation of the coil 4. The frequency can be set to correspond to the resonant frequency of the oscillatory system formed by the two components 1 and 2 and the leaf springs 13. At resonance, a highly robust oscillatory action can be produced with relatively little energy input.

Figure 2:
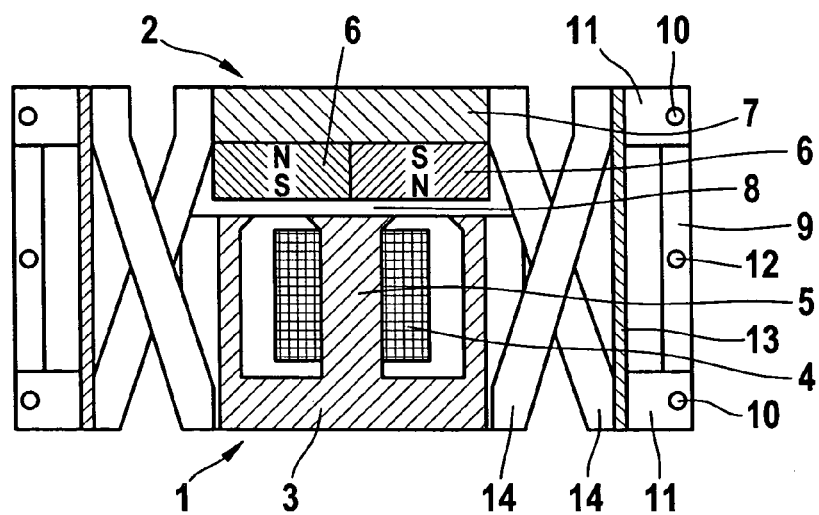
FIG. 2 is a cross-sectional view of a further embodiment of an oscillatory linear motor.

FIG. 2 shows a further embodiment of the linear motor in a representation that corresponds to FIG. 1. This embodiment differs from FIG. 1 essentially in that two reversing levers 14 are associated with each post 9. Each of the reversing levers 14 establishes a rigid connection between one of the bearing blocks 11 and the iron core 3 or the carrier plate 7. The reversing levers 14, rather than extending to the neighboring iron core 3 or the neighboring carrier plate 7, extend from the bearing blocks 11 to the opposite lying component such that the reversing levers 14 cross each other. The reversing levers 14 do not rest directly against the bearing blocks 11 but hold the leaf springs 13 clamped between the reversing levers 14 and the bearing blocks 11. Through the crossed arrangement of the reversing levers 14, the transverse movement accompanying the oscillatory motion of the first and second component 1 and 2 reverses its direction. As a result, the width of the air gap 8 is changed at periodic intervals. Hence the air gap 8 adopts its smallest value in the position of equilibrium shown in FIG. 2. Generally, the width of the air gap 8 increases as the amount of displacement increases.

Figure 3:
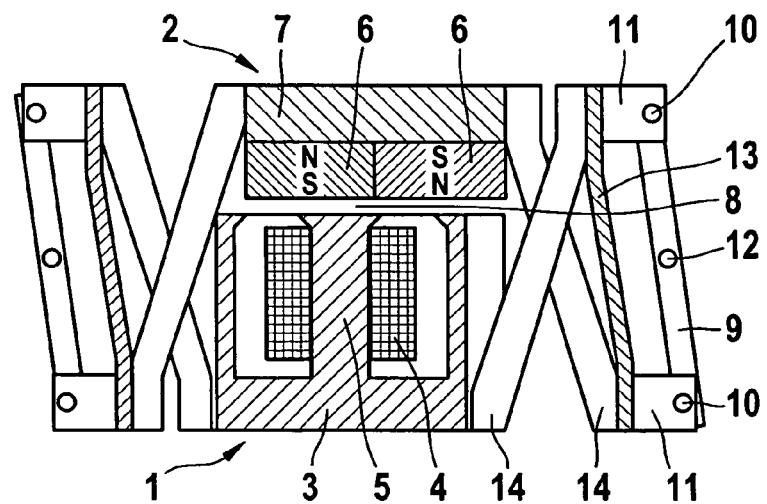
FIG. 3 is a cross-sectional view of the linear motor of FIG. 2 in a displaced state of motion.

An example of a displaced condition is shown in FIG. 3. In this snapshot, the first component 1 is displaced to the left and the second component 2 to the right of the position of equilibrium. Apart from the reversing levers 14, the drive mechanism of FIGS. 2 and 3 generally corresponds in its construction and operation to the drive mechanism illustrated in FIG. 1. The drive mechanism of FIGS. 2 and 3 can be applied, for example, in cases in which the described difference in behavior concerning the variation in width of the air gap 8 is desirable.

Contrary to the central arrangement of the mounting axle 12 between the connecting axles 10 shown in FIGS. 1, 2 and 3, it is also possible to select an off-center arrangement (e.g., when large oscillation amplitudes of the first and the second component 1 and 2 are desirable). When using the linear motor described herein on an electric shaver it is possible, for example, to operate the undercutter with a large oscillation amplitude and the shaving foil with a small oscillation amplitude.

Furthermore, it is possible to improve (e.g., optimize) the vibration behavior through the position of the mounting axle 12 relative to the connecting axles 10. To keep the vibrations in the area of the mounting axle 12, which is used for mounting the linear motor, as small as possible, the mounting axle 12 can be arranged such that the product of the total mass of the first component 1 plus any components formed fast therewith multiplied by the effective lever arm for this mass relative to the mounting axle 12 adopts the same value as the product of the total mass of the second component 2 plus any components formed fast therewith multiplied by the effective lever arm for this mass relative to the mounting axle 12.

Figure 4:
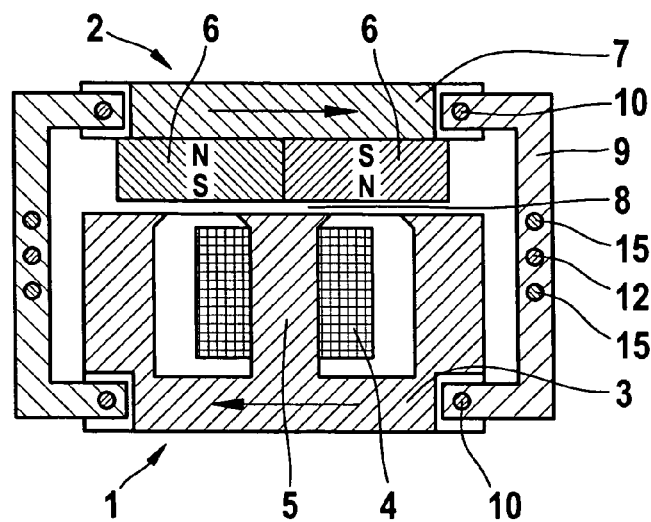
FIG. 4 is a cross-sectional view of another embodiment of an oscillatory linear motor.

FIG. 4 shows another embodiment of an oscillatory linear motor. The linear drive mechanism of FIG. 4 differs from the linear drive mechanism of FIG. 1 in that provision is made for additional drive mounts 15 that enable additional units to be driven by the linear motor of FIG. 4. Also, the posts 9 are not rod-shaped but U-shaped and have their legs linked directly to the iron core 3 and to the carrier plate 7. For the sake of clarity the leaf springs 13 are omitted from the illustration.

Each post 9 has two additional drive mounts 15 arranged on either side of the mounting axle 12. On each post 9, one additional drive mount 15 is arranged on the side of the first component 1, and therefore moves in phase with the first component 1. The second additional drive mount 15 of the same post 9 is arranged on the side of the second component 2, moving in phase with the second component 2 and in phase opposition to the first additional drive mount 15. As the two additional drive mounts 15 of each post 9 are arranged closer to the mounting axle 12 than the two connecting axles 10 of the same post 9, the motions of devices mounted to the additional drive mounts 15 have a substantially smaller amplitude than the motions of the first and the second component 1 and 2. If the mounting axle 12, as shown in FIG. 4, is arranged centrally between the two additional drive mounts 15 of the post 9, then the amplitudes of motion produced from these drive mounts are of substantially equal magnitude. The modules driven by way of the drive mounts 15 can also be taken into consideration when improving (e.g., optimizing) the vibration behavior. Minimal vibrations occur when the sum of all pulses equals zero.

With the geometry shown in FIG. 4, a vanishing overall pulse is achieved when the mass of the first component 1 plus the modules moving in phase with the first component 1 equals the mass of the second component 2 plus the modules moving in phase with the second component 2.

The embodiment of the linear motor shown in FIG. 4 can be used, for example, on an electric shaver having two cutter assemblies. The linear motor is mounted by means of the two mounting axles 12 on the housing of the shaver. One cutter assembly is coupled to the first component 1 and one to the second component 2 such that the two cutter assemblies move in phase opposition to each other. The head of the shaver and hence the shaving foil is operated by coupling it to an additional drive mount 15 with a small amplitude. If the shaver has two separate shaving foils it is also possible to drive the two shaving foils in phase opposition to each other by coupling them to two drive mounts 15 with a small amplitude. In this case the coupling can be made such that the movement of each shaving foil also takes place in phase opposition to its associated cutter assembly.

If the initially referred to curve-shaped tracks of travel of the first and the second component 1 and 2 are not desirable and more linear motions are required, then the forced guidance of the first and the second component 1 and 2 can be modified accordingly. One such modification option includes using linear guides that can force the first and second component 1 and 2 to travel on a linear route with relatively high precision. It is alternatively or additionally possible to carry out the modifications shown in FIG. 5.

Figure 5:
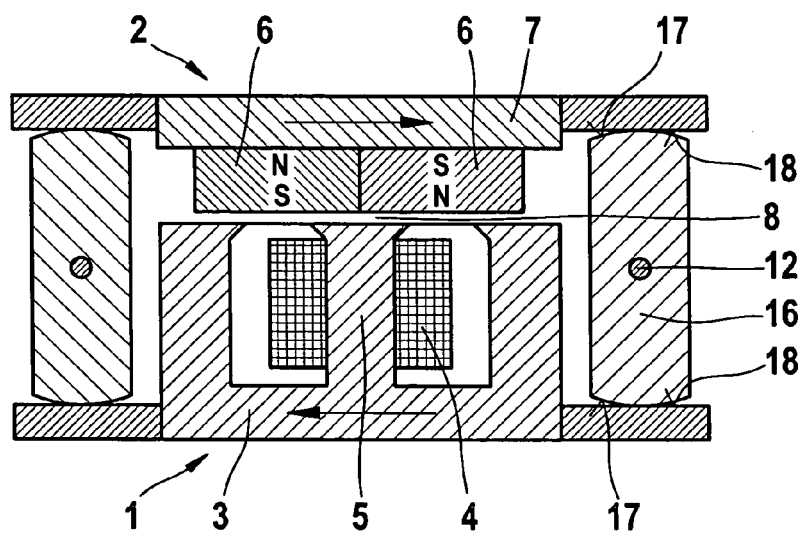
FIG. 5 is a cross-sectional view of an embodiment of an oscillatory linear motor enabling particularly precise linear motion.

FIG. 5 shows an embodiment of a linear motor with which it is possible to produce particularly precise linear motions. The type of representation was selected in accordance with FIG. 1, with the leaf springs 13 omitted again for the sake of clarity of illustration. In this embodiment, the coupling of the first and the second component 1 and 2 is effected by means of two spacer elements 16. The spacer elements 16 are rotatably mounted by means of the mounting axles 12. The spacer elements 16 are curved at their respective end surfaces 17, which are supported on seating surfaces 18 of the first and the second component 1 and 2.

During operation of the linear motor, the seating surfaces 18 roll off the end surfaces 17 of the spacer elements 16, turning the spacer elements 16 about the mounting axles 12. Consequently, a mechanical coupling of the movements of the first and the second component 1 and 2 can be achieved. Furthermore, the curvature on each end surface 17 can be constructed such that the distance between the opposing seating surfaces 18 is maintained substantially unchanged throughout the process, notwithstanding the oscillatory motions of the first and second component 1 and 2. For example, the end surface 17 can be constructed as a cylinder segment, with the cylinder axis coinciding with the mounting axle 12. As the permanent magnets 6 exert a strong attraction on the iron core 3, it may not be necessary to provide a mechanical connection between the spacer elements 16 and the iron core 3 or the carrier plate 7. However, suitable holders can be provided. The seating surfaces 18 and the end surfaces 17 may be constructed to include meshing teeth in order to prevent the phase relationship between the first and the second component 1 and 2 from changing due to slip or similar effects occurring between the seating surfaces 18 and the end surfaces 17.

The structural configuration of the two components 1 and 2 may vary according to the requirements and the space available for the particular application. Several embodiments of the components 1 and 2 are presented in FIGS. 6 to 9. The linear drive mechanisms of FIGS. 6 to 9 may be arranged similarly to the linear drive mechanism illustrated in FIG. 1. However, for improved clarity of illustration, other elements of the linear motor such as the posts 9 and the leaf springs 13 are not shown in these figures. These and, where applicable, other elements may be added in order to fully construct the linear motor. In the following embodiments the coil 4 and the permanent magnets 6 are arranged partly on the same component. Hence this component could be designated as the iron core 3 as well as the carrier plate 7. To ensure clarity of terms, the component will hereinafter be designated as iron core 3 when it has a coil 4 and additionally, if applicable, permanent magnets 6. If it has only permanent magnets 6, the component will hereinafter be designated as carrier plate 7.

Figure 6:
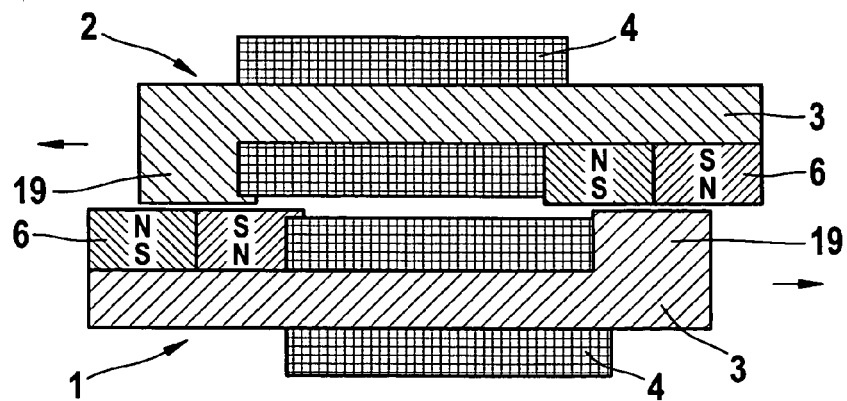
FIG. 6 is a cross-sectional view of an embodiment of an oscillatory linear motor having substantially identical first and second components.

FIG. 6 shows an embodiment in which the first and the second components 1 and 2 are of identical construction. The two components 1 and 2 each have an elongated iron core 3, and a shoulder 19 is formed on one end of the iron core 3. The coil 4 is wound on the iron core 3 directly adjacent to the shoulder 19. The permanent magnets 6 are adhered to the iron core 3 adjacent to the coil 4 near the end of the iron core 3 opposite the shoulder 19. Thus, the components 1 and 2 lie opposite each other with opposite polarity. For example, the shoulder 19 of the first component 1 can be positioned adjacent to the permanent magnets 6 of the second component 2, and the permanent magnets 6 of the first component 1 can be positioned adjacent to the shoulder 19 of the second component 2. In this embodiment, the counter-oscillating components 1 and 2 have substantially the same mass and are arranged in close proximity to each other. As a result of the substantially identical construction of the two components 1 and 2, the manufacturing process can be simplified and the number of parts to be manufactured can be reduced.

Figure 7:
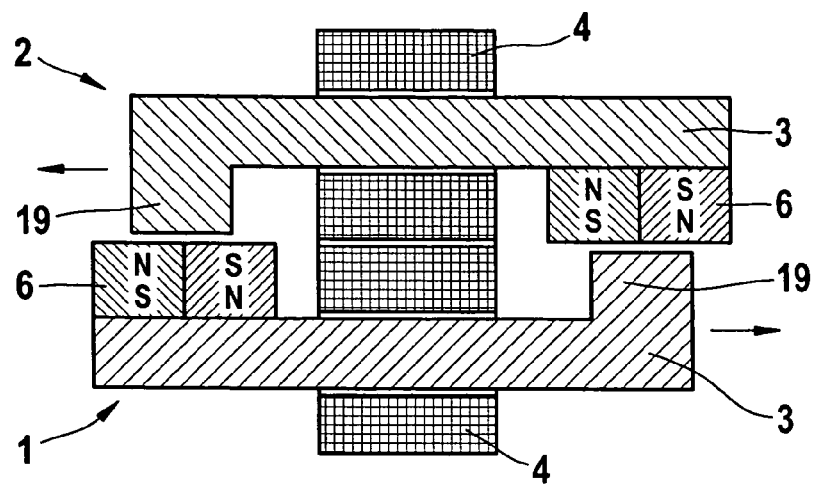
FIG. 7 is a cross-sectional view of an embodiment of an oscillatory linear motor having substantially identical first and second components and two stationary coils.

FIG. 7 shows another embodiment in which the first and the second component 1 and 2 are of substantially identical construction. This embodiment differs from FIG. 6 in that a clearance space is maintained between the coil 4 and the adjacent shoulder 19 and between the coil 4 and the adjacent permanent magnets 6. Furthermore, the coils 4 are not fixed to the iron cores 3 in the embodiment of FIG. 7. Hence the coils 4 are not mechanically connected to the other parts of the components 1 and 2. Consequently, the coils 4 are stationary (e.g., the coils 4 do not move along with the components 1 and 2).

As a result of this construction, the mass that is moved can be reduced, thereby reducing vibrations. On the other hand the contacting of the coils 4 is simplified because they do not move and as such do not make such high demands on the contact configuration. The iron cores 3 can be constructed similarly to those described above in FIG. 6. Thus, the iron cores 3 can help to provide oscillatory motion in the manner described above with respect to FIG. 6.

Figure 8:
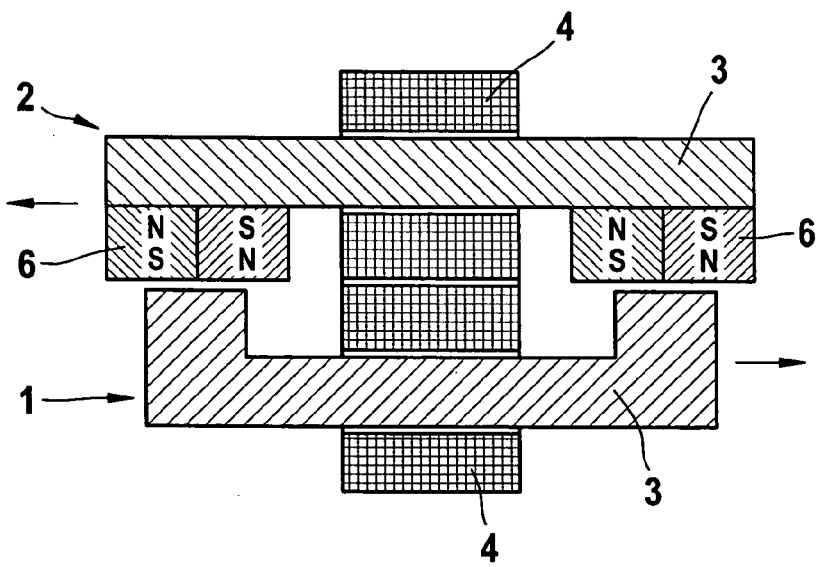
FIG. 8 is a cross-sectional view of a further embodiment of an oscillatory linear motor having first and second components and two stationary coils.

FIG. 8 shows another embodiment of a linear drive mechanism with stationary coils 4. This embodiment has one U-shaped and one rod-shaped iron core 3. Each iron core 3 has a coil 4 that surrounds the iron core 3. Each of the coils 4 is spaced a small distance from its associate iron core 3 to enable the iron core 3 to be displaced relative to the coil 4. Furthermore, the permanent magnets 6 are adhered to the rod-shaped iron core 3 near the ends of the iron core 3. The iron cores 3 are positioned relative to each other such that the legs of the U-shaped iron core 3 are adjacent to the permanent magnets 6 of the rod-shaped iron core 3.

Figure 9:
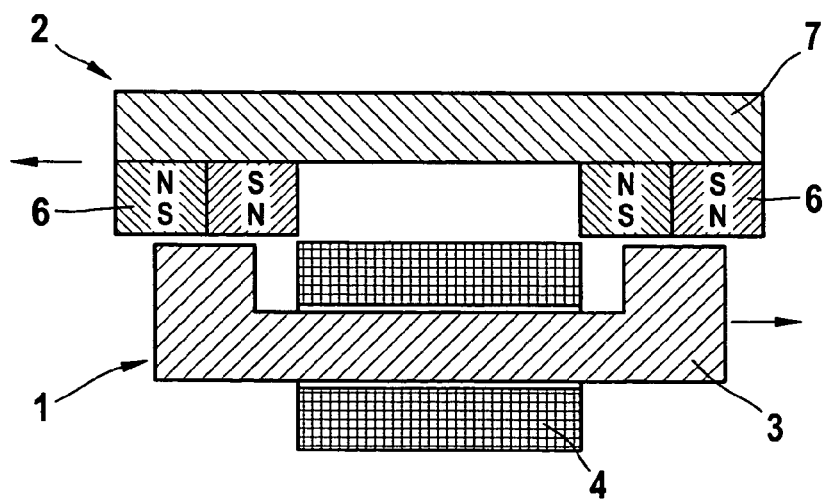
FIG. 9 is a cross-sectional view of an embodiment of an oscillatory linear motor having first and second components and one stationary coil.

FIG. 9 shows another embodiment of a linear drive mechanism. This embodiment differs from FIG. 8 in that there is only one coil 4. The coil 4 surrounds the U-shaped iron core 3. The coil 4 and the core 3 are separated from each other by a relatively small distance, enabling the U-shaped iron core 3 to be displaced relative to the coil 4. Consequently, the U-shaped iron core 3 can oscillate while the coil 4 remains stationary. The permanent magnets 6, which are adhered to the carrier plate 7, are arranged adjacent to the legs of the U-shaped iron core 3.

Figure 10:
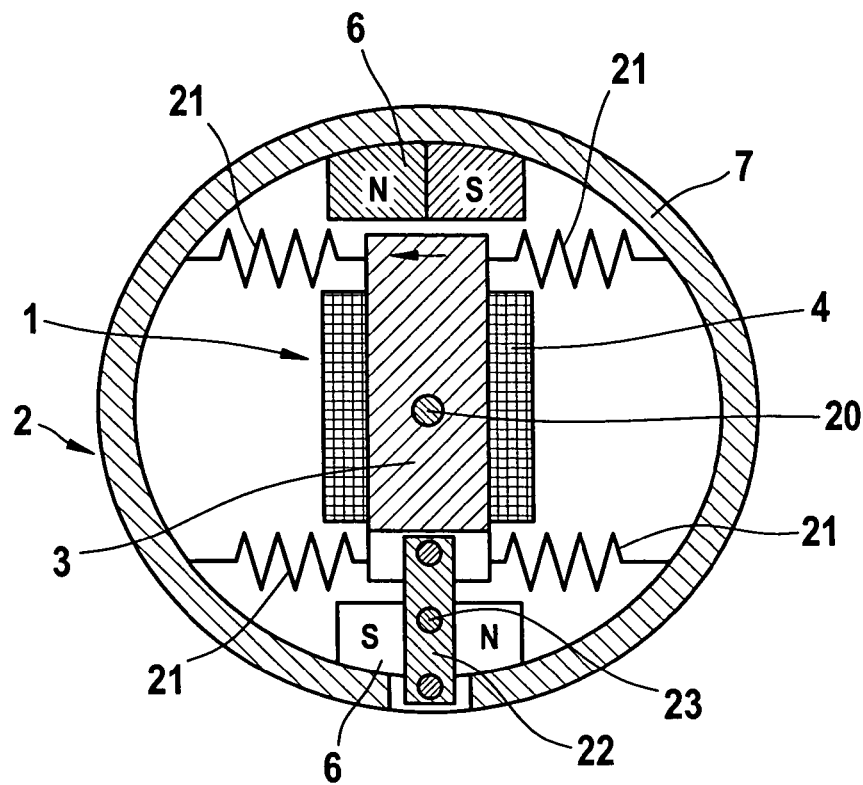
FIG. 10 is a cross-sectional view of an embodiment of an oscillatory rotary motor.
Figure 11:
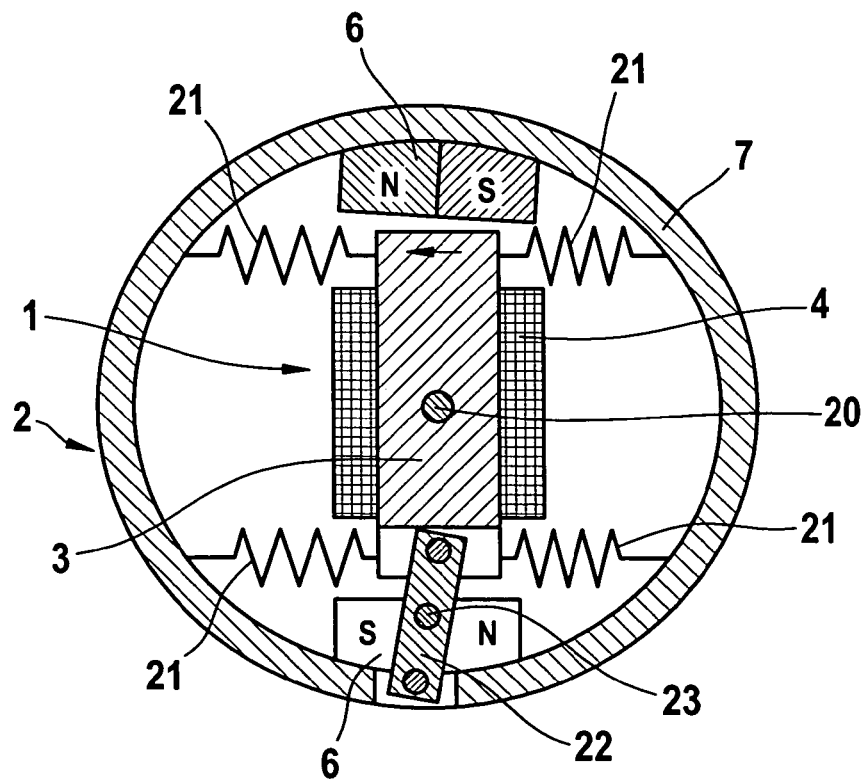
FIG. 11 is a cross-sectional view of the oscillatory rotary motor of FIG. 11 in a displaced state of motion.

As an alternative to the oscillatory linear motors described above, it is also possible to construct the drive mechanisms described herein as oscillatory rotary motors, as shown in FIGS. 10 and 11.

FIGS. 10 and 11 show an embodiment of an oscillatory rotary motor in various states of motion in a representation corresponding to FIG. 1. In FIG. 10, the first and the second component 1 and 2 of the rotary motor are in a position of equilibrium. In FIG. 11, both the first and the second component 1 and 2 are displaced.

Referring to FIGS. 10 and 11, the iron core 3 is constructed in a rod shape and the coil 4 is wound around the iron core 3. When electric current flows through the coil, magnetic poles are formed at the respective ends of the iron core 3. At least one permanent magnet 6 is arranged near either end of the iron core 3, such that one magnetic north pole and one magnetic south pole lie side by side, substantially equally spaced apart from the end of the iron core 3. The carrier plate 7, on which the permanent magnets 6 are arranged, is constructed in an annular shape and surrounds the iron core 3 and coil 4. This enables undesirable stray magnetic fields to be reduced. At the center of the annular carrier plate 7, which coincides with the center of the iron core 3, is a center axle 20 for rotatably mounting both the first component 1 and the second component 2. The only degree of freedom of motion for the first component 1 and the second component 2 is a rotation around this center axle 20. A helical spring 21 is fitted on either opposing side in the two end areas of the iron core 3. The helical springs 21 extend from their points of application on the iron core 3 to the carrier plate 7. In the absence of other forces, the first component 1 is held by the helical springs 21 in the position of equilibrium shown in FIG. 10.

A rotary beam 22 has one end that is rotatably linked to an end area of the iron core 3. The other end of the rotary beam 22 is rotatably linked to the carrier plate 7. The rotary beam 22 is rotatably suspended by means of a centrally arranged center axle 23. The center axle 23 may also be used for connecting the rotary motor to a device that is driven by the rotary drive mechanism. Alternatively or additionally, the connection to the device may be effected through the center axle 20.

An oscillatory rotary motion can be produced with the rotary motor in the following manner:

When an electric current flows through the coil 4, a magnetic field is generated and acts upon the permanent magnets 6. This results in a displacement of the first and second components 1 and 2 out of their positions of equilibrium. As shown in FIGS. 10 and 11, this displacement involves moving the upper permanent magnet 6 slightly to the right and the lower permanent magnet 6 slightly to the left. Conversely, the upper end of the iron core 3 is moved slightly to the left and the lower end of the iron core 3 slightly to the right, such that the displaced position illustrated in FIG. 11 is adopted. Owing to the forced guidance of the center axle 20, these displacements take place along an orbital path (e.g., they are rotary movements). The flow of electric current in the coil 4 can be changed such that the relationships are reversed and the permanent magnets 6 and the ends of the iron core 3 are displaced to the other side.

Through suitable activation of the coil 4, it is possible to produce oscillatory rotary motions of the first component 1 and the second component 2 that take place in phase opposition to each other. The oscillatory rotary motion is assisted by the helical springs 21, particularly when the coil 4 is activated such that the first and the second component 1 and 2 oscillate with the resonant frequency. The maintenance of the phase relationship is assured by the rotary beam 22, which, through its linking and bearing as shown in FIGS. 10 and 11, constrains the two components 1 and 2 to be in phase opposition to each other. Maintenance of the phase relationship may alternatively or additionally be accomplished by other devices. For example, it is possible to provide a gearwheel including teeth that mesh with teeth of the first component 1 and with teeth of the second component 2.

Other embodiments are within the scope of the following claims.

What is claimed is:

1. A small electric appliance drive mechanism comprising:
   a first drive component;
   a second drive component; and
   a coil configured to produce a magnetic field extending from the first drive component and acting on the second drive component;
   wherein the first drive component and the second drive component are movably arranged in the small electric appliance and adapted to oscillate in phase opposition to one another.

2. The drive mechanism of claim 1, wherein at least one of the drive components comprises at least one permanent magnet.

3. The drive mechanism of claim 1, wherein at least one of the drive components comprises a wound core on which the coil is arranged.

4. The drive mechanism of claim 1, further comprising at least one elastic element configured to produce restoring forces.

5. The drive mechanism of claim 1, wherein the first drive component and the second drive component are mechanically coupled to each other by at least one coupling element.

6. The drive mechanism of claim 5, wherein the coupling element is rotatably linked to the first drive component and to the second drive component.

7. The drive mechanism of claim 5, wherein the coupling element is rotatably mounted to a small electric device.

8. The drive mechanism of claim 7, wherein the coupling element is rotatably mounted on a mounting axle for mounting the drive mechanism on the small electric appliance.

9. The drive mechanism of claim 8, wherein the mounting axle is arranged mid-way between a link of the coupling element to the first drive component and to the second drive component.

10. The drive mechanism of claim 5, wherein the coupling element comprises a rotary beam.

11. The drive mechanism of claim 5, wherein the coupling element comprises at least one drive mount arranged to provide an oscillatory motion that has an amplitude different than an amplitude of the oscillations of the first and the second drive components.

12. The drive mechanism of claim 1, wherein the drive mechanism comprises a linear motor in which the drive components are slidable relative to each other.

13. The drive mechanism of claim 12, further comprising a leaf spring fastened to the first drive component and to the second drive component.

14. The drive mechanism of claim 13, wherein the leaf spring is fastened to at least one of the drive components in a configuration to allow movement of the leaf spring across a direction of movement of the drive components.

15. The drive mechanism of claim 13, further comprising a coupling element linked to at least one of the drive components in a configuration to allow movement of the coupling element across a direction of movement of the drive components.

16. The drive mechanism of claim 12, further comprising a coupling element rotatably linked to reversing levers, each of the reversing levers being connected to the drive component positioned farther away from a location at which the coupling element and the reversing levers are linked.

17. The drive mechanism of claim 12, wherein the product of a mass of the first drive component and a distance between a linking location of a coupling element on the first drive component and a mounting axle is equal to the product of a mass of the second drive component and a distance between a linking location of the coupling element on the second drive component and the mounting axle.

18. The drive mechanism of claim 12, wherein the drive components are of identical construction.

19. The drive mechanism of claim 12, wherein a wound core is slidably arranged relative to the coil.

20. The drive mechanism of claim 12, wherein movement of the first drive component and the second drive component is guided by linear bearings.

21. The drive mechanism of claim 12, further comprising at least one spacer element arranged to maintain a constant distance between the first drive component and the second drive component.

22. The drive mechanism of claim 21, wherein the spacer element is rotatably mounted to a mounting axle.

23. The drive mechanism of claim 21, wherein the spacer element defines curved surfaces engaging seating surfaces of the first and the second drive components.

24. The drive mechanism of claim 23, wherein the curved surfaces are constructed as cylinder segments.

25. The drive mechanism of claim 24, wherein cylinder axes associated with the cylinder segments coincide with a mounting axle.

26. The drive mechanism of claim 1, wherein the drive mechanism comprises a rotary motor in which the drive components are adapted to rotate relative to each other.

27. The drive mechanism of claim 26, wherein the drive components have a common axis of rotation.

28. The drive mechanism of claim 26, further comprising a gearwheel comprising teeth configured to engage teeth of the first drive component and teeth of the second drive component.

29. A small electric appliance comprising:
    a housing;
    a work unit; and
    the drive mechanism of claim 1 positioned within the housing.

30. A shaving device comprising:
    a housing;
    a cutting element configured to cut hair; and
    the drive mechanism of claim 1 positioned within the housing to drive the cutting element.

* * * * *